(12) United States Patent
Hayes et al.

(10) Patent No.: US 11,416,615 B2
(45) Date of Patent: Aug. 16, 2022

(54) CONFIGURING TRUSTED REMOTE MANAGEMENT COMMUNICATIONS USING UEFI

(71) Applicant: Dell Products, L.P., Round Rock, TX (US)

(72) Inventors: Stuart W. Hayes, Round Rock, TX (US); Charles Emmanuel Rose, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 205 days.

(21) Appl. No.: 17/010,281

(22) Filed: Sep. 2, 2020

(65) Prior Publication Data
US 2022/0067161 A1    Mar. 3, 2022

(51) Int. Cl.
| | |
|---|---|
| G06F 21/00 | (2013.01) |
| G06F 21/57 | (2013.01) |
| G06F 21/60 | (2013.01) |
| G06F 21/31 | (2013.01) |
| G06F 9/4401 | (2018.01) |
| G06F 13/42 | (2006.01) |
| G06F 21/64 | (2013.01) |

(52) U.S. Cl.
CPC .......... *G06F 21/572* (2013.01); *G06F 9/4416* (2013.01); *G06F 13/4282* (2013.01); *G06F 21/31* (2013.01); *G06F 21/602* (2013.01); *G06F 21/64* (2013.01); *G06F 2221/0751* (2013.01)

(58) Field of Classification Search
CPC .. G06F 21/572; G06F 9/4416; G06F 13/4282; G06F 21/31; G06F 21/602; G06F 21/64; G06F 2221/0751; G06F 21/606; G06F 21/6236; G06F 21/74; H04L 63/06
See application file for complete search history.

(56) References Cited

U.S. PATENT DOCUMENTS

| | | | | |
|---|---|---|---|---|
| 7,904,708 | B2 * | 3/2011 | Harmer | G06F 9/4401 713/1 |
| 9,477,848 | B2 * | 10/2016 | Nicholes | G06F 21/71 |
| 9,830,457 | B2 * | 11/2017 | Vidyadhara | G06F 21/575 |

(Continued)

FOREIGN PATENT DOCUMENTS

| | | | |
|---|---|---|---|
| TW | 201627911 A | * | 8/2016 |
| WO | WO-2022019910 A1 | * | 1/2022 |

*Primary Examiner* — John B King
(74) *Attorney, Agent, or Firm* — Fogarty LLP

(57) ABSTRACT

Methods and system are provided for remote management of an IHS (Information Handling System). A keypair is generated by a client management application using operating system capabilities of the IHS. The client management application, as a privileged operating system user, writes a public key of the keypair to UEFI (Unified Extensible Firmware Interface) variables stored within a secured data storage device of the IHS. A BIOS of the IHS retrieves the public key from the UEFI variables and uses it to encrypt a remote management secret. The BIOS writes the encrypted secret back to the UEFI variables. The client management application uses the keypair to recover the remote management secret from the encrypted secret that was written to the UEFI variables by the BIOS. The secret is used to establish a secure remote management session between the client management application and a remote access controller of the IHS.

20 Claims, 3 Drawing Sheets

(56) References Cited

U.S. PATENT DOCUMENTS

| | | | |
|---|---|---|---|
| 2008/0155247 A1* | 6/2008 | Zimmer | G06F 12/1408 |
| | | | 711/163 |
| 2009/0300265 A1* | 12/2009 | Vyssotski | G11C 16/349 |
| | | | 711/E12.001 |
| 2011/0029764 A1* | 2/2011 | Harmer | G06F 9/451 |
| | | | 717/109 |
| 2015/0089238 A1* | 3/2015 | Lewis | H04L 9/3236 |
| | | | 713/183 |
| 2016/0328564 A1* | 11/2016 | Vidyadhara | G06F 21/575 |
| 2017/0085383 A1* | 3/2017 | Rao | G06F 21/575 |
| 2018/0293061 A1* | 10/2018 | Arms | G06F 8/654 |
| 2019/0080092 A1* | 3/2019 | Lewis | G06F 21/44 |
| 2019/0227876 A1* | 7/2019 | Dardis | G06F 8/71 |
| 2019/0332468 A1* | 10/2019 | Chaiken | G06F 11/106 |
| 2021/0240468 A1* | 8/2021 | Shanmugam | G06F 8/658 |
| 2021/0286692 A1* | 9/2021 | Chien | G06F 9/4401 |

* cited by examiner

CONFIGURING TRUSTED REMOTE MANAGEMENT COMMUNICATIONS USING UEFI

FIELD

This disclosure relates generally to Information Handling Systems (IHSs), and more specifically, to supporting secure remote administration of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Large numbers of IHSs may be utilized within data center environments. A data center may include IHSs, such as enterprise servers, that are stacked and installed within racks. A data center may include large numbers of such racks. Some administration of such data center IHSs may be done locally, but a significant amount of the administration of data center IHSs may be conducted via operations by remote administrators. Accordingly, within a data center, IHSs may be organized into networks of IHSs that are remotely managed as distinct groups. Effectively managing such groups of IHSs may be accomplished using software tools that allow administrators to remotely collect information from the IHSs and that interoperate with client management applications that operate on each of the individual IHSs. Secure remote management of an IHS may be supported by establishing a trusted communication session between remote tools and the client management applications that are operating on the IHSs.

SUMMARY

In various embodiments, IHSs (Information Handling Systems) are provided that may include: a secured data storage device comprising storage for UEFI (Unified Extensible Firmware Interface) variables utilized by the IHS; a plurality of data storage devices coupled to a processor and storing operating system instructions; the processor providing privileged operating system users with access to the UEFI variables, wherein the processor executes the operating systems instructions that generate a keypair and that comprise a client management application that writes a public key of the keypair to the UEFI variables, wherein the client management application is allowed to write data to the UEFI variables as a privileged operating system user; and a BIOS configured to: retrieve the public key from the UEFI variables; encrypt a remote management secret using the public key; and write the encrypted remote management secret to the UEFI variables; and wherein the client management application uses the keypair to recover the remote management secret from the encrypted remote management secret written to the UEFI variables, and wherein the remote management secret is used to establish a secure remote management session between the client management application and a remote access controller of the IHS.

In additional IHS embodiments, the secured data storage device comprises a SPI (Serial Peripheral Interface) flash and wherein the UEFI variables are stored in a restricted region of the SPI flash. In additional IHS embodiments, firmware instructions of the BIOS are validated against a reference signature stored in the secured data storage device prior to granting the BIOS permission to write data to the UEFI variables. In additional IHS embodiments, the client management application comprises instructions that are validated against a reference signature stored in the secured data storage device prior to granting the client management application permission to write data to the UEFI variables. In additional IHS embodiments, the reference signature of the client management application is stored in the secured data storage device by the BIOS. In additional IHS embodiments, the BIOS is provided the reference signature of the client management application by the remote access controller. In additional IHS embodiments, the secure remote management session comprises a Redfish remote management session. In additional IHS embodiments, the UEFI variables are utilized in support of the Redfish remote management session.

In various additional embodiments, methods are provided for remote management of an IHS (Information Handling System). The method may include: providing restricted access to a plurality UEFI (Unified Extensible Firmware Interface) variables stored within a secured data storage device of the IHS; generating, by an operating system of the IHS, a keypair; writing, by a client management application of the operating system, a public key of the keypair to the UEFI variables, wherein the client management application is allowed to write data to the UEFI variables as a privileged operating system user; retrieving, by a BIOS of the IHS, the public key from the UEFI variables; encrypting, by the BIOS, a remote management secret using the public key; writing, by the BIOS, the encrypted secret to the UEFI variables; recovering, by the client management application, through use of the keypair, the remote management secret from the encrypted secret written to the UEFI variables by the BIOS; and using the secret is used to establish a secure remote management session between the client management application and a remote access controller of the IHS.

In additional method embodiments, the secured data storage device comprises a SPI (Serial Peripheral Interface) flash and wherein the UEFI variables are stored in a restricted region of the SPI flash. In additional method embodiments, firmware instructions of the BIOS are validated against a reference signature stored in the secured data storage device prior to granting the BIOS permission to write data to the UEFI variables. In additional method embodiments, the client management application comprises instructions that are validated against a reference signature stored in the secured data storage device prior to granting the client management application permission to write data to the UEFI variables. In additional method embodiments, the reference signature of the client management application is stored in the secured data storage device by the BIOS. In additional method embodiments, the BIOS is provided the reference signature of the client management application by the remote access controller. In additional method embodiments, the secure remote management session comprises a Redfish remote management session.

In various additional embodiments, remote access controllers are provided that support remote management of an Information Handling System (IHS). The remote access controllers may include a memory device having instructions stored thereon that, upon execution by a logic unit, cause the remote access controller to: generate a remote management secret; direct a BIOS of the IHS to retrieve a public key from a plurality of UEFI variables utilized by the IHS, wherein the public key is written to the UEFI variables by a client management application running in an operating system of the IHS, and wherein the UEFI variables are stored in a secured data storage of the IHS, and wherein the client management application is allowed to write data to the UEFI variables as a privileged operating system user; encrypt the remote management secret using the public key; direct the BIOS to write the encrypted remote management secret to the UEFI variables, wherein the client management application running in the operating system uses a private key associated with public key to recover the remote management secret from the encrypted remote management secret written to the UEFI variables; and establish a secure remote management session with the client management application using the remote management secret recovered by the client management application.

In additional remote access controller embodiments, the client management application comprises instructions that are validated against a reference signature stored in the secured data storage device prior to granting the client management application permission to write data to the UEFI variables. In additional remote access controller embodiments, the reference signature of the client management application is stored in the secured data storage device by the BIOS. In additional remote access controller embodiments, the BIOS is provided the reference signature of the client management application by the remote access controller. In additional remote access controller embodiments, the secure remote management session comprises a Redfish remote management session.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. It should be appreciated that although certain IHSs described herein may be discussed in the context of an enterprise computing servers, other embodiments may be utilized.

As described, IHSs may be remotely managed by administrators using remote management tools that interoperate with client software programs that operate on the managed IHSs. In various scenarios, such remote management of IHSs may be supported using customized management protocols and/or using standardized protocols, such as the Redfish specification that has been provided by the Distributed Management Task Force (DMTF). The Redfish specification defines interfaces for remotely managing IHSs and, in particular, managing servers and other IHSs installed within data center environments. These remote management protocols may support secure communications between the client software programs operating on IHSs and the remote management tools. However, configuring these secure communications is complicated by the need to establish trust between the client software programs on the managed IHSs and the remote management tools.

Figure 1:
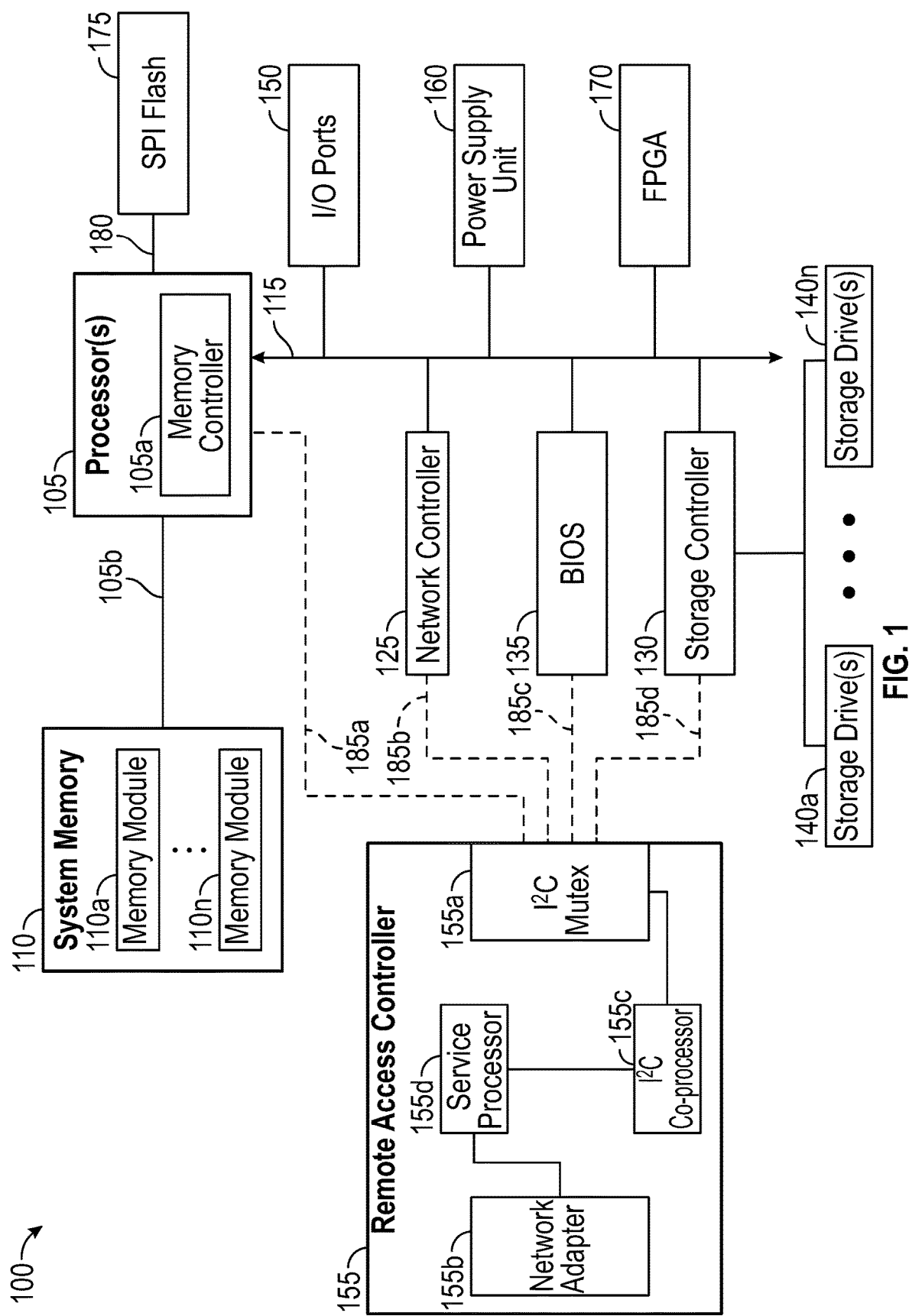
FIG. 1 is a diagram illustrating certain components of an IHS operable, according to some embodiments, for configuring trusted communications using UEFI (Unified Extensible Firmware Interface) in support of remote management of IHS.

FIG. 1 is a diagram illustrating certain components of an IHS 100 operable, according to some embodiments, for configuration of trusted communications using UEFI (Unified Extensible Firmware Interface) in support of remote management of IHS 100. Although the embodiments provided herein describe an IHS that is a rack-mounted server, other embodiments may be implemented using other types of IHSs. In the illustrative embodiment of FIG. 1, IHS 100 may be a server that would typically be installed within a chassis, that in turn would be typically installed within slots of a rack that may be housed within a datacenter. Installed in this manner, IHS 100 may utilize certain shared resources provided by the chassis and/or rack, such as power and networking. In some embodiments, multiple servers such as IHS 100 may be installed within a single chassis. For instance, IHS 100 may be a 1RU (Rack Unit) server that may be installed directly within a rack or may be installed within a chassis, such as a 2RU chassis, with another 1RU IHS server installed in the other slot of the chassis.

IHS 100 may include one or more processors 105. In some embodiments, processors 205 may include a main processor and a co-processor, each of which may include a plurality of processing cores. IHS 100 may operate using a chipset that may be implemented by integrated circuits that couple processor 105 to various other components of the motherboard of IHS 100. In some embodiments, all or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways provided by the single illustrated bus 115. In certain embodiments, bus 115 may include a PCIe (PCI Express) switch fabric that is accessed via a root complex and serves to couple processor 101 to a variety of internal and external PCIe devices.

In certain embodiments, IHS 100 may include a SPI (Serial Peripheral Interface) flash device 175 that stores certain data and instructions utilized by processor 105. The SPI flash 175 may be a non-volatile memory device capable of being electrically erased and reprogrammed. SPI flash 175 may be coupled to the chipset 105 of IHS over an SPI bus 180 that supports transfers of blocks of data to and from SPI flash 175. In some embodiments, SPI flash 175 may be divided into various region, with each region storing different types of instructions and/or data. In certain embodiments, some of the regions of SPI flash 175 may be provisioned during trusted manufacture of IHS 100, such as with boot code, cryptographic keys, firmware reference signatures, and tokens that are used to implement security protocols utilized by IHS 100. SPI flash 175 may support various security measures that restrict access to different regions to privileged users, as well as supporting restrictions that limit write privileges in certain regions to privileged users.

In some embodiments, SPI flash 175 may store data and/or instructions utilized in support of BIOS and UEFI operations by IHS 100. As described in additional detail with regard to the below embodiments, SPI flash 175 may be used to store certain data utilized by UEFI, such as variables that are used to configure UEFI operations. Various software programs, including software programs running within operating systems of IHS 100 may access UEFI variables that are stored in SPI flash 175. However, as described below, access to UEFI variables stored in a SPI flash 175 region may be restricted to certain privileged users. In some embodiments, permission to modify the UEFI variables stored in SPI flash 175 (i.e., write to a region storing UEFI variables) may also be restricted to certain privileged users.

As illustrated, processor(s) 105 may include an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 100 via a high-speed memory interface 105b. System memory 110 may include memory components, such as such as static RAM (SRAM), dynamic RAM (DRAM), NAND Flash memory, suitable for supporting high-speed memory operations by the processor(s) 105. System memory 110 may combine both persistent, non-volatile memory and volatile memory. In certain embodiments, the system memory 110 may be comprised of multiple removable memory modules. The system memory 110 of the illustrated embodiment includes removable memory modules 110a-n. Each of the removable memory modules 110a-n may utilize a form factor corresponding to a motherboard expansion card socket that receives a specific type of removable memory module 110a-n, such as a DIMM (Dual In-line Memory Module). Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

As illustrated, IHS 100 may also include a power supply unit 160 that provides the components of the chassis with appropriate levels of DC power. The power supply unit 160 may receive power inputs from an AC power source or from a shared power system that is provided by a rack within which IHS 100 may be installed. In certain embodiments, power supply unit 160 may be implemented as a swappable component that may be used to provide IHS 100 with redundant, hot-swappable power supply units. In some embodiments, power supply unit 160 may provide power to components of IHS 100 using multiple independent power planes. For instance, as described below, remote access controller 155 may be powered via a separate power plane from processor 105.

In certain embodiments, IHS 100 may include one or more I/O controllers 110 that may each support couplings with hardware components such as user I/O devices and other external devices that may include storage devices. For instance, an I/O controller 110 may provide access to one or more user I/O devices 110, such as a keyboard, mouse, touchpad, touchscreen, microphone, speakers, or camera that may be coupled to IHS 100 via a variety of ports. Each of the supported user I/O devices may interface with I/O controller 110 through wired or wireless connections. In some embodiments, I/O controller 110 may be a USB controller that may also implement functions of a USB hub. In some embodiments, a USB controller may be a dedicated microcontroller that is coupled to the motherboard of IHS 100. In other embodiments, USB controller may be implemented as a function of another component, such as a component of a SoC of processor 105. USB controller supports communications between IHS 100 and one or more USB devices coupled to IHS 100.

As illustrated, processor(s) 105 may also be coupled to a network controller 125, such as provided by a Network Interface Controller (NIC) that is coupled to the IHS 100 and allows the IHS 100 to communicate via an external network, such as the Internet or a LAN. Network controller 125 may include various microcontrollers, switches, adapters, and couplings used to connect IHS 100 to a network, where such connections may be established by IHS 100 directly or via shared networking components and connections provided by a chassis in which IHS 100 is installed. In some embodiments, network controller 125 may allow IHS 100 to interface directly with network controllers from other nearby IHSs in support of clustered processing capabilities that utilize resources from multiple IHSs. In some embodiments, network controller 125 may be a swappable component that may be externally accessed and replaced while IHS 100 remains operational. As illustrated, network controller 125 may be instrumented with a controller or other logic unit that supports a sideband management connection 185b with remote access controller 155.

IHS 100 may include one or more storage controllers 130 that may be utilized to access storage drives 140a-n that are accessible via the chassis in which IHS 100 is installed. Storage controllers 130 may provide support for RAID (Redundant Array of Independent Disks) configurations of logical and physical storage drives 140a-n. In some embodiments, storage controller 130 may be an HBA (Host Bus Adapter) that provides more limited capabilities in accessing physical storage drives 140a-n. In many embodiments, storage drives 140a-n may be replaceable, hot-swappable storage devices that are installed within bays provided by the chassis in which IHS 100 is installed. In some embodiments, storage drives 140a-n may also be accessed by other IHSs that are also installed within the same chassis as IHS 100. Although a single storage controller 130 is illustrated in FIG. 1, IHS 100 may include multiple storage controllers that may operate similarly to storage controller 130. In embodiments where storage drives 140a-n are hot-swappable devices that are received by bays of chassis, the storage drives 140a-n may be coupled to IHS 100 via couplings between the bays of the chassis and a midplane or backplane 145 of IHS 100. Storage drives 140a-n may include SAS (Serial Attached SCSI) magnetic disk drives, SATA (Serial Advanced Technology Attachment) magnetic disk drives, solid-state drives (SSDs) and other types of storage drives in various combinations. As illustrated, storage controller 130 may be instrumented with a controller or other logic unit that supports a sideband management connection 185d with remote access controller 155.

IHS 100 may include one or more programmable logic devices, such as FPGA (Field-Programmable Gate Array) card(s) 170 or other types of CPLD (Complex Programmable Logic Device) cards. Each of the FPGA devices 170 supported by IHS 100 may include various processing and memory resources, in addition to integrated circuits that may be reconfigured after deployment of IHS 100 through programming functions supported by the FPGA logic devices 170. Each individual FPGA 170 may be optimized to perform specific processing tasks, such as specific signal processing, security, data mining, and artificial intelligence functions, and/or to support specific hardware coupled to IHS 100.

IHS 100 may also include a BIOS (Basic Input/Output System) 135 that may include instructions stored in a non-volatile memory that may be accessible by processor 105. The BIOS 135 provides an abstraction layer that allows an operating system of the IHS 100 to interface with the hardware components of the IHS 100. Accordingly, BIOS 135 provides an abstraction layer to the firmware utilized by various hardware components of IHS 100. In some embodiments, BIOS 135 may be implemented using a dedicated microcontroller coupled to the motherboard of IHS 100. In some embodiments, some or all of BIOS 135 may be implemented as operations of an embedded controller, such remote access controller 155. Upon powering or restarting IHS 100, processor(s) 105 may utilize BIOS 135 to initialize and test various hardware components of the IHS 100. Upon successful validation of these hardware components, in some embodiments, BIOS 135 may also initiate loading of an operating system for use by the IHS 100.

As illustrated, BIOS 135 may be instrumented with a controller or other logic unit that supports a sideband management connection 185b with remote access controller 155. In certain embodiments, this sideband management connection 185b may be utilized by remote access controller 155 to direct operations of BIOS 135 in configuring a secure remote management session with a client application running in the operating system of IHS 100. For instance, remote access controller 155 may direct BIOS 135 to access UEFI variables, such as to retrieve a public key stored to these variables by the client application and to store an encrypted remote management secret, such as a password, back to these UEFI variables.

In some embodiments, BIOS 135 may operate based on firmware instructions that may be validated against a reference signature for those firmware instructions, where this reference signature may be generated as part of trusted manufacture or provisioning of IHS 100 and where this signature is stored to a secured data storage of IHS 100. In some embodiments, BIOS 135 may include a management mode that restricts the operations of BIOS 135 to operations using firmware instructions that have been validated, such as against a reference signature for these instructions. In some embodiments, BIOS 135 may be limited to accessing certain secured resources, such as UEFI variables stored in a secured region of SPI flash 175, while operating in such a management mode that utilizes trusted instructions. The Unified Extensible Firmware Interface (UEFI) was designed as a successor to BIOS. As a result, many IHSs utilize UEFI in addition to also including BIOS. As described in additional detail below, in systems that include support for both BIOS and UEFI, embodiments utilize certain BIOS and UEFI capabilities in order to configure a trusted remote management session between a remote access controller 155 of IHS 100 and client management applications running in the operating system of IHS 100.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

As described, In some embodiments, remote access controller 155 may operate from a different power plane from the processors 105, storage drives 140a-n and other components of IHS 100, thus allowing the remote access controller 155 to operate, and management tasks to proceed, while the processing cores of IHS 100 are powered off. In some embodiments, various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may support monitoring and administration of various managed devices 105, 125, 130, 135 of an IHS via a sideband bus interface. For instance, messages utilized in device management may be transmitted using I2C sideband bus connections 185a-d that may be individually established with each of the respective managed devices 105, 125, 130, 135 through the operation of an I2C multiplexer 155a of the remote access controller. As illustrated, certain of the managed devices of IHS 100, such as BIOS 135, network controller 125, storage controller 130, are coupled to the IHS processor(s) 105 via an in-band bus 115, such as a PCIe root complex, that is separate from the I2C sideband bus connections 185a-d used for device management. Accordingly, managed devices 125, 130 and 135 communicate with the operating system of IHS 100 via this in-band bus 115, with the sideband bus used exclusively for communications with remote access controller 155.

In certain embodiments, the service processor 155d of remote access controller 155 may rely on an I2C co-processor 155c to implement sideband I2C communications between the remote access controller 155 and managed components 105, 125, 130, 135 of the IHS. The I2C co-processor 155c may be a specialized co-processor or microcontroller that is configured to interface via a sideband I2C bus interface with the managed hardware components 105, 125, 130, 135 of IHS. In some embodiments, the I2C co-processor 155c may be an integrated component of the service processor 155d, such as a peripheral system-on-chip feature that may be provided by the service processor 155d. Each I2C bus 185a-d is illustrated as single line in FIG. 1. However, each I2C bus 185a-d may be comprised of a clock line and data line that couple the remote access controller 155 to I2C endpoints 105, 125, 130, 135 on each of the managed components.

As illustrated, the I2C co-processor 155c may interface with the individual managed devices 105, 125, 130, 135 via individual sideband I2C buses 185a-d selected through the operation of an I2C multiplexer 155a. Via switching operations by the I2C multiplexer 155a, a sideband bus connection 185a-d may be established by a direct coupling between the I2C co-processor 155c and an individual managed device 105, 125, 130, 135. In providing sideband management capabilities, the I2C co-processor 155c may each interoperate with corresponding endpoint I2C controllers that implement the I2C communications of the respective managed devices 105, 125, 130, 135. The endpoint I2C controllers may be implemented as dedicated microcontrollers for communicating sideband I2C messages with the remote access controller 155, or endpoint I2C controllers may be integrated SoC functions of a processor of the respective managed device endpoints 105, 125, 130, 135.

As described in additional detail below, remote access controller 155 may initiate configuration of secure management sessions with client applications running in the operating system of IHS 100. As described, remote access controller 155 may utilize sideband connections 185a-d for interfacing directly with some components of IHS 100, thus supporting remote management of these components. However, implementing some remote management operations may require remote access controller 155 communicating with client applications that run within the operating system of IHS 100, thus necessitating the use of in-band communications between remote access controller 155 and these client applications. In some embodiments, such in-band remote management communications may be supported by a remote management protocol, such as the Redfish specification.

Embodiments provide techniques for configuring secure in-band remote management communications, such as via Redfish, between remote access controller 155 and a client application running in the operating system of IHS 100. In various embodiments, remote access controller 155 may transmit a remote management secret, such as a password, to an in-band client application by encrypting the secret with a public key retrieved from a protected UEFI variable, where this public key is written to this protected UEFI variable by the client application. The client application retrieves this encrypted remote management secret from the UEFI variable and is able decrypt it using a private key corresponding to the public key that the client application wrote to the UEFI variable. In this manner, remote access controller 155 may provide the remote management secret to in-band applications, such as a trusted client application, that has been granted permission to write data to a secured UEFI variable storage. In some embodiments, a trusted client application will be granted such permissions only upon its operating instructions being validated against a references signature for those operating instructions. In some embodiments, the reference signature may be provided by remote access controller 155. Accordingly, remote access controller 155 may configure remote management sessions with client applications that can be established as being trusted both by the remote access controller 155 and the operating system.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

Figure 2:
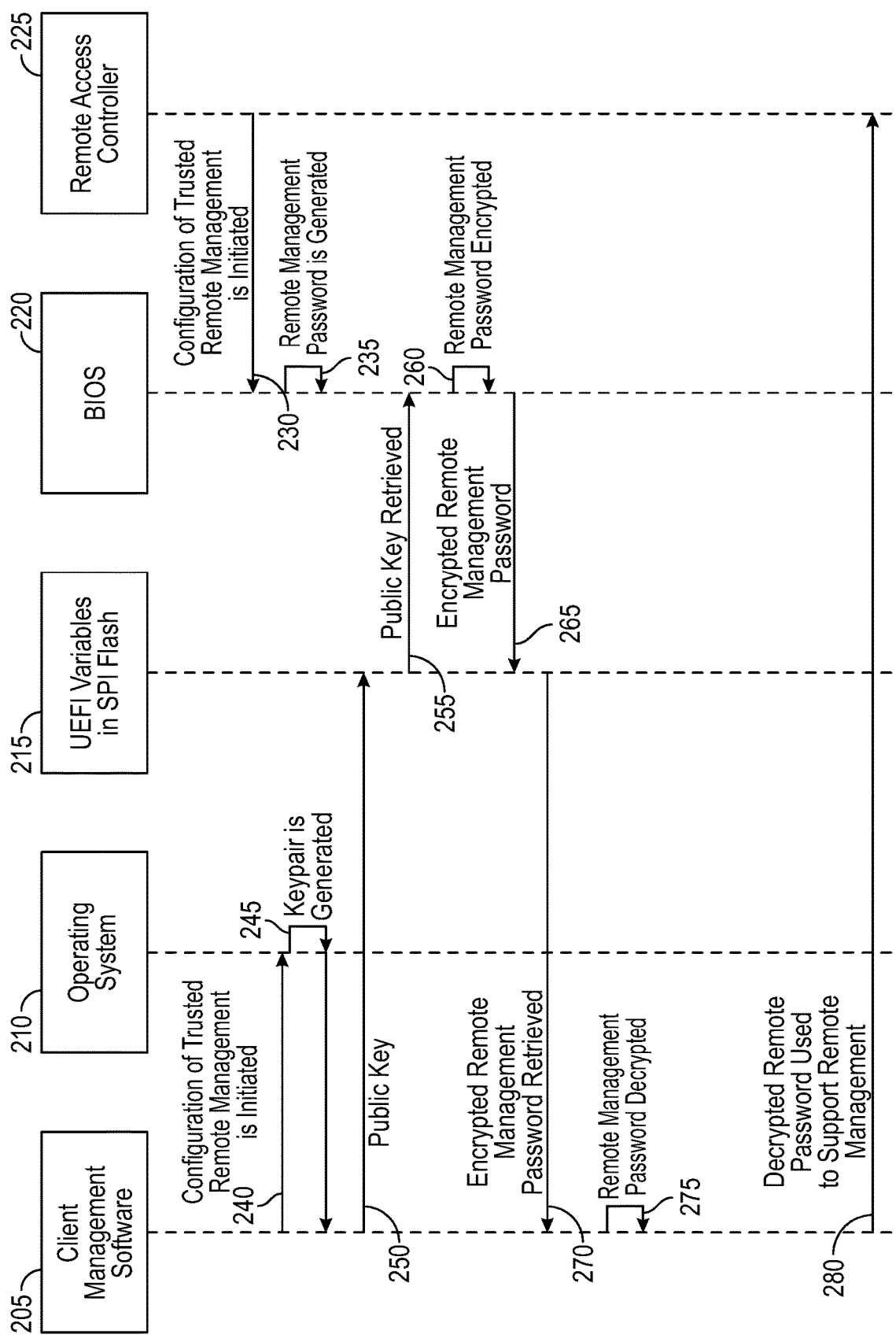
FIG. 2 is a swim lane diagram describing the operation of certain components of an IHS, according to some embodiments, in configuring trusted communications using UEFI in support of remote management of the IHS.
Figure 3:
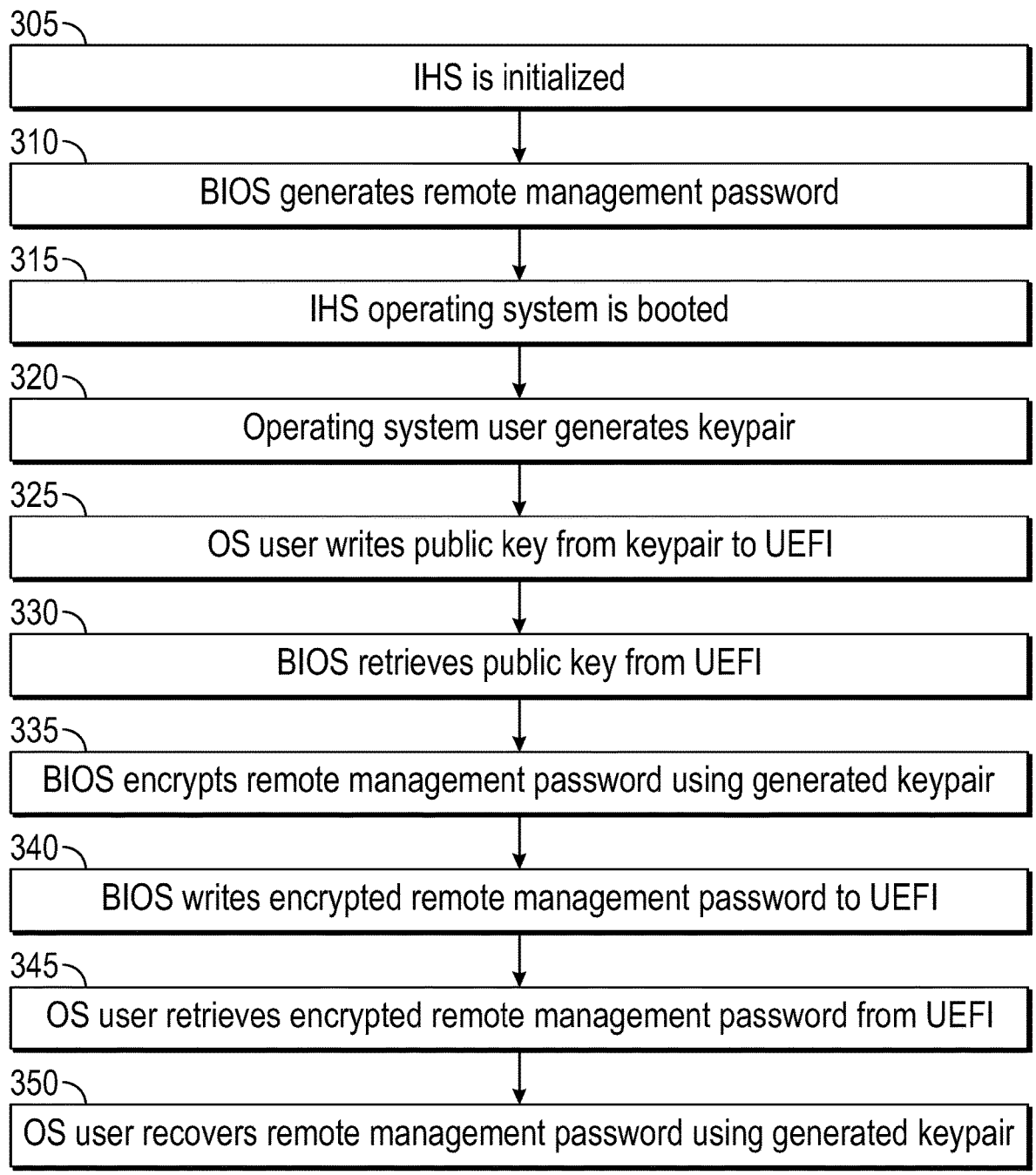
FIG. 3 is a flowchart describing certain steps of a method, according to some embodiments, for configuring trusted communications using UEFI in support of remote management of an IHS.

FIG. 2 is a swim lane diagram describing the operation of certain components of an IHS, according to some embodiments, in configuring trusted communications using UEFI in support of remote management of the IHS. A flowchart is provided in FIG. 3 that describes certain steps of a method for configuring trusted communications using UEFI, according to some embodiments, that may be implemented via the component operations of the swim lane diagram of FIG. 2. Some embodiments may begin, at block 305, with the initialization of an IHS that is to be managed remotely, such as IHS 100 of FIG. 1 that is managed remotely through the operations of remote access controller 155. As illustrated in FIG. 2, upon initialization of the IHS to be remotely managed, remote access controller 225 may initiate, at 230, configuration of a remote management session with a client management software application 205 that runs within the operating system 210 of the IHS that is to be remotely managed.

As indicated in FIG. 2, in some embodiments, this configuration process may be initiated by directing the BIOS 220 to begin a handshake procedure for configuring a secure communication session with the client software applications 205 on behalf of the remote access controller 225. At block 310 of FIG. 3 and at 235 of FIG. 2, BIOS 220 generates a password or other secret for use in remote management operations between remote access controller 225 and the client application 205. In some instances, BIOS 220 may generate a password that is a random sequence of alphanumeric or other allowed characters. In some instances, this password or other secret information may be provided to the BIOS 220 by remote access controller 225 via the sideband management connection between these two components. As indicated in FIG. 2, after this remote management password has been generated, BIOS 220 waits until configuration of the secure remote management communication session has been initiated by the client management application 205 of the operating system. In some embodiments, the remote management password may be generated only after receiving an indication that the client application 205 has initiated the remote management session.

In some instances, the operating system 215 of the IHS may be booted, at block 315, concurrent with the initiation of the secure remote management session by BIOS 220. Upon being booted, a client management application 205 may be initiated as a software program running within the operating system 210 of the IHS. Upon being initialized, this client management application 205 may proceed, at 240, to configure a secure remote management session with the remote access controller 220 of the IHS. At block 320, a key pair may be generated for use by the client management application 205 in establishing this remote management session. As illustrated in FIG. 2, the remote management application 205 may rely on cryptographic capabilities of the operating system 210 in order to generate 245 a key pair. From this key pair generated by the operating system 210, at block 325, the client management application 205 writes the public key from this key pair to a UEFI variable. As described, client application 205 may be granted permission to write data to the protected UEFI variable storage on the basis of the client application 205 being a privileged user of the operating system 210 and, in some cases, based on instructions utilized by client application 205 being validated.

As indicated in FIG. 2, the UEFI variables to which the public key is written by the client application, at 250, may be stored in a SPI flash 215 of the IHS to be remotely managed. As described with regard to FIG. 1, an IHS may include a SPI flash data storage device 175 that provides persistent storage of certain critical information, where the data maintained by the SPI flash may be segregated into various data storage regions. In certain instances, the different regions of the SPI flash 215 may be associated with different security policies that may limit the users that are allowed to access a particular region, as well as restricting the users that are allowed to write data within a particular region. In some embodiments, one such region of the SPI flash 215 may be dedicated for use in supporting certain UEFI operations, in particular for storing UEFI variables. As described, remote management of an IHS may utilize remote management protocols that implement secure remote management sessions between a client software application running in an operating system, such as application 205 running in operating system 210, and a remote management tool, such as tools supported by remote access controller 220. Securing such remote management sessions, however, may require securely exchanging session information between the client application 205 and the remote access controller 220. Embodiments may utilize UEFI variables for exchanging information necessary to establish such secure remote management sessions.

In embodiments where UEFI variables are maintained in a region of an SPI flash device, such as SPI flash 175 of FIG. 1 that is controlled by processor 105, access to that particular region of the SPI flash may be strictly limited to particular users, with additional restrictions limiting the ability to write data to these UEFI variables stored in SPI flash to particular privileged users. As a critical component that may operate using firmware instructions that may be validated based on reference signatures stored in a highly protected region of SPI flash, BIOS 220 may be granted permission to both access the UEFI variables and to modify these variables. In some instances, BIOS 220 may be further restricted in accessing and modifying these variables while operating in a management mode, such as described with regard to FIG. 1. In a similar manner, the client management application 205 may also be granted permission to access and modify UEFI variables stored in SPI flash 215. In some embodiments, remote management application 205 may be granted such permissions based on validation of its operating instructions against a reference signature that may be stored in a region of SPI flash. In certain embodiments, this reference signature may be stored in this region of SPI flash through the operations of remote access controller 225 that will be interoperating with client management application 205. In this manner, remote access controller 225 may be assured of initiating a secure remote management session only with a client management application 205 that is operating using recognized and validated instructions.

Utilizing permissions allowing it to write data to the UEFI variables stored in SPI flash 215, at 250, the client management application 205 writes the public key to a UEFI variable. At block 330, this change to the UEFI variables is detected and the BIOS process that has initiated configuration of the secure remote management session retrieves the public key. Using this retrieved public key, at 260 and at block 335, the BIOS encrypts the generated remote management password, or other secret. Using its permissions allowing it to write data to UEFI variables in SPI flash 215, at 265 and at block 340, the BIOS 220 writes this encrypted value back to the UEFI variables, in some cases to the same variable from which the public key was retrieved. Upon this modification to the UEFI variables been detected, at 270 and at block 345, the client management application 205 retrieves the encrypted value that was written to the UEFI variables by the BIOS 220.

At block 350, the client management application 205 utilizes the private key of the key pair generated by operating system 210 in order to decrypt the retrieved value and thus recover the remote management password. As illustrated in FIG. 2, using this recovered password, at 280, the client management application 205 may establish a secure remote management session with the remote access controller 255. Using such capabilities provided by embodiments, remote access controller 255 may distribute a remote management password only to privileged users that have been authenticated and granted permission to write data to a protected resource, in particular the region of SPI flash that is used to store UEFI variables. In embodiments where UEFI variables are utilized in this manner, remote management protocols that utilize UEFI capabilities may support secure communication sessions between remote access controller 255 and client management application 205 with the understanding that the client application is a trusted software component. In some embodiments the trustworthiness of the client application may be periodically validated by the client application transmitting, via the secure communication session, a hash of the contents of a portion of the protected SPI flash that stores the UEFI variables. The remote access controller may task the BIOS, via the sideband management connection, with accessing the SPI flash to calculate a hash of this same portion of the SPI flash. If these hash calculated by the BIOS matches the hash provided by the client application, the remote access controller is provided with assurances that the client application is and remains a privileged operating system user with permission to access protected UEFI variables.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
a secured data storage device comprising storage for UEFI (Unified Extensible Firmware Interface) variables utilized by the IHS;
a plurality of data storage devices coupled to a processor and storing operating system instructions;
the processor providing privileged operating system users with access to the UEFI variables, wherein the processor executes the operating systems instructions that generate a keypair and that comprise a client management application that writes a public key of the keypair to the UEFI variables, wherein the client management application is allowed to write data to the UEFI variables as a privileged operating system user; and
a BIOS configured to:
retrieve the public key from the UEFI variables;
encrypt a remote management secret using the public key; and
write the encrypted remote management secret to the UEFI variables; and
wherein the client management application uses the keypair to recover the remote management secret from the encrypted remote management secret written to the UEFI variables, and wherein the remote management secret is used to establish a secure remote management session between the client management application and a remote access controller of the IHS.

2. The IHS of claim 1, wherein the secured data storage device comprises a SPI (Serial Peripheral Interface) flash and wherein the UEFI variables are stored in a restricted region of the SPI flash.

3. The IHS of claim 1, wherein firmware instructions of the BIOS are validated against a reference signature stored in the secured data storage device prior to granting the BIOS permission to write data to the UEFI variables.

4. The IHS of claim 1, wherein the client management application comprises instructions that are validated against a reference signature stored in the secured data storage device prior to granting the client management application permission to write data to the UEFI variables.

5. The IHS of claim 4, wherein the reference signature of the client management application is stored in the secured data storage device by the BIOS.

6. The IHS of claim 5, wherein the BIOS is provided the reference signature of the client management application by the remote access controller.

7. The IHS of claim 1, wherein the secure remote management session comprises a Redfish remote management session.

8. The IHS of claim 7, wherein the UEFI variables are utilized in support of the Redfish remote management session.

9. A method for remote management of an IHS (Information Handling System), the method comprising:
providing restricted access to a plurality UEFI (Unified Extensible Firmware Interface) variables stored within a secured data storage device of the IHS;
generating, by an operating system of the IHS, a keypair;
writing, by a client management application of the operating system, a public key of the keypair to the UEFI variables, wherein the client management application is allowed to write data to the UEFI variables as a privileged operating system user;
retrieving, by a BIOS of the IHS, the public key from the UEFI variables;
encrypting, by the BIOS, a remote management secret using the public key;
writing, by the BIOS, the encrypted secret to the UEFI variables;
recovering, by the client management application, through use of the keypair, the remote management secret from the encrypted secret written to the UEFI variables by the BIOS; and
using the secret is used to establish a secure remote management session between the client management application and a remote access controller of the IHS.

10. The method of claim 9, wherein the secured data storage device comprises a SPI (Serial Peripheral Interface) flash and wherein the UEFI variables are stored in a restricted region of the SPI flash.

11. The method of claim 9, wherein firmware instructions of the BIOS are validated against a reference signature stored in the secured data storage device prior to granting the BIOS permission to write data to the UEFI variables.

12. The method of claim 9, wherein the client management application comprises instructions that are validated against a reference signature stored in the secured data storage device prior to granting the client management application permission to write data to the UEFI variables.

13. The method of claim 12, wherein the reference signature of the client management application is stored in the secured data storage device by the BIOS.

14. The method of claim 13, wherein the BIOS is provided the reference signature of the client management application by the remote access controller.

15. The method of claim 9, wherein the secure remote management session comprises a Redfish remote management session.

16. A remote access controller supporting remote management of an Information Handling System (IHS), the remote access controller comprising a memory device having instructions stored thereon that, upon execution by a logic unit, cause the remote access controller to:
  generate a remote management secret;
  direct a BIOS of the IHS to retrieve a public key from a plurality of UEFI variables utilized by the IHS, wherein the public key is written to the UEFI variables by a client management application running in an operating system of the IHS, and wherein the UEFI variables are stored in a secured data storage of the IHS, and wherein the client management application is allowed to write data to the UEFI variables as a privileged operating system user;
  encrypt the remote management secret using the public key;
  direct the BIOS to write the encrypted remote management secret to the UEFI variables, wherein the client management application running in the operating system uses a private key associated with public key to recover the remote management secret from the encrypted remote management secret written to the UEFI variables; and
  establish a secure remote management session with the client management application using the remote management secret recovered by the client management application.

17. The remote access controller of claim 16, wherein the client management application comprises instructions that are validated against a reference signature stored in the secured data storage device prior to granting the client management application permission to write data to the UEFI variables.

18. The remote access controller of claim 17, wherein the reference signature of the client management application is stored in the secured data storage device by the BIOS.

19. The remote access controller of claim 18, wherein the BIOS is provided the reference signature of the client management application by the remote access controller.

20. The remote access controller of claim 16, wherein the secure remote management session comprises a Redfish remote management session.

* * * * *